United States Patent Office 2,764,799
Patented Oct. 2, 1956

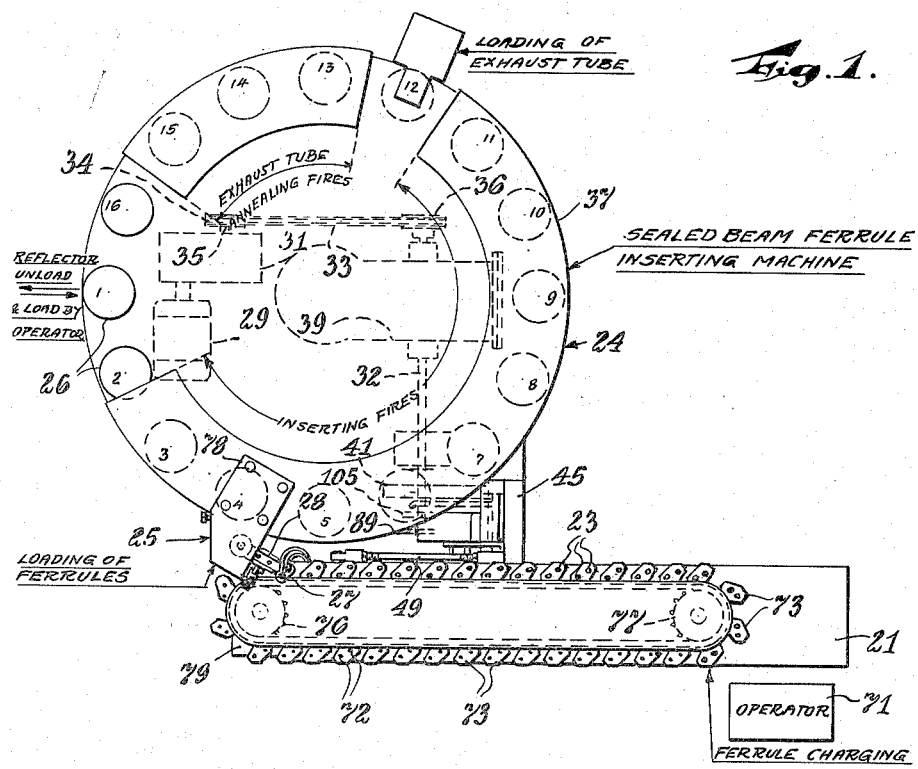
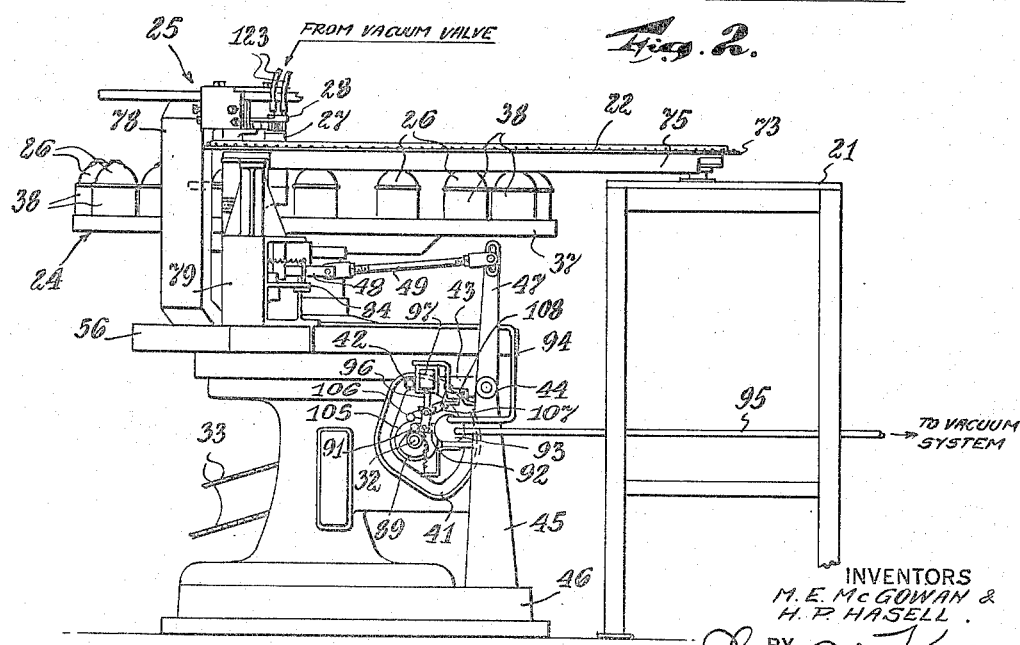

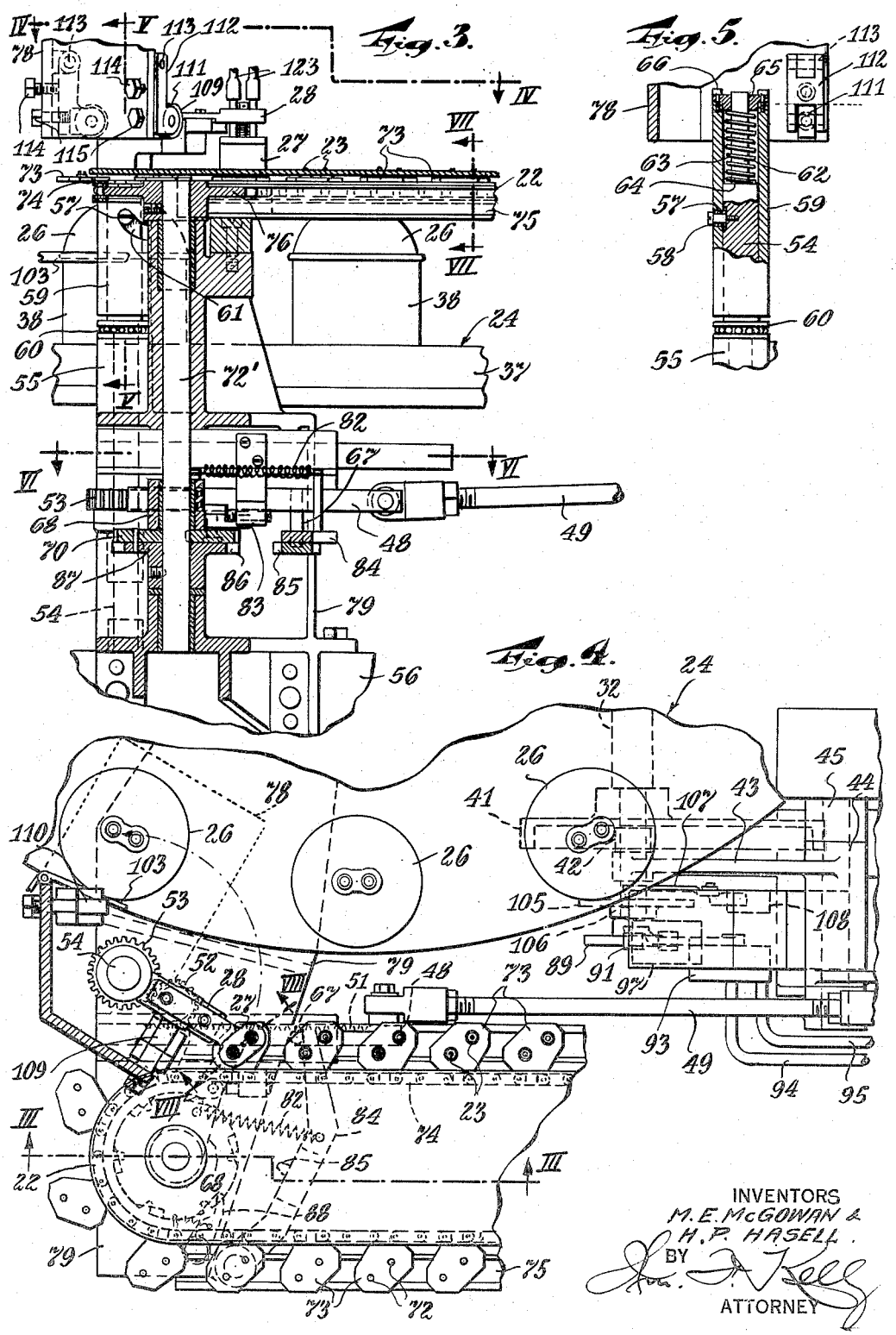

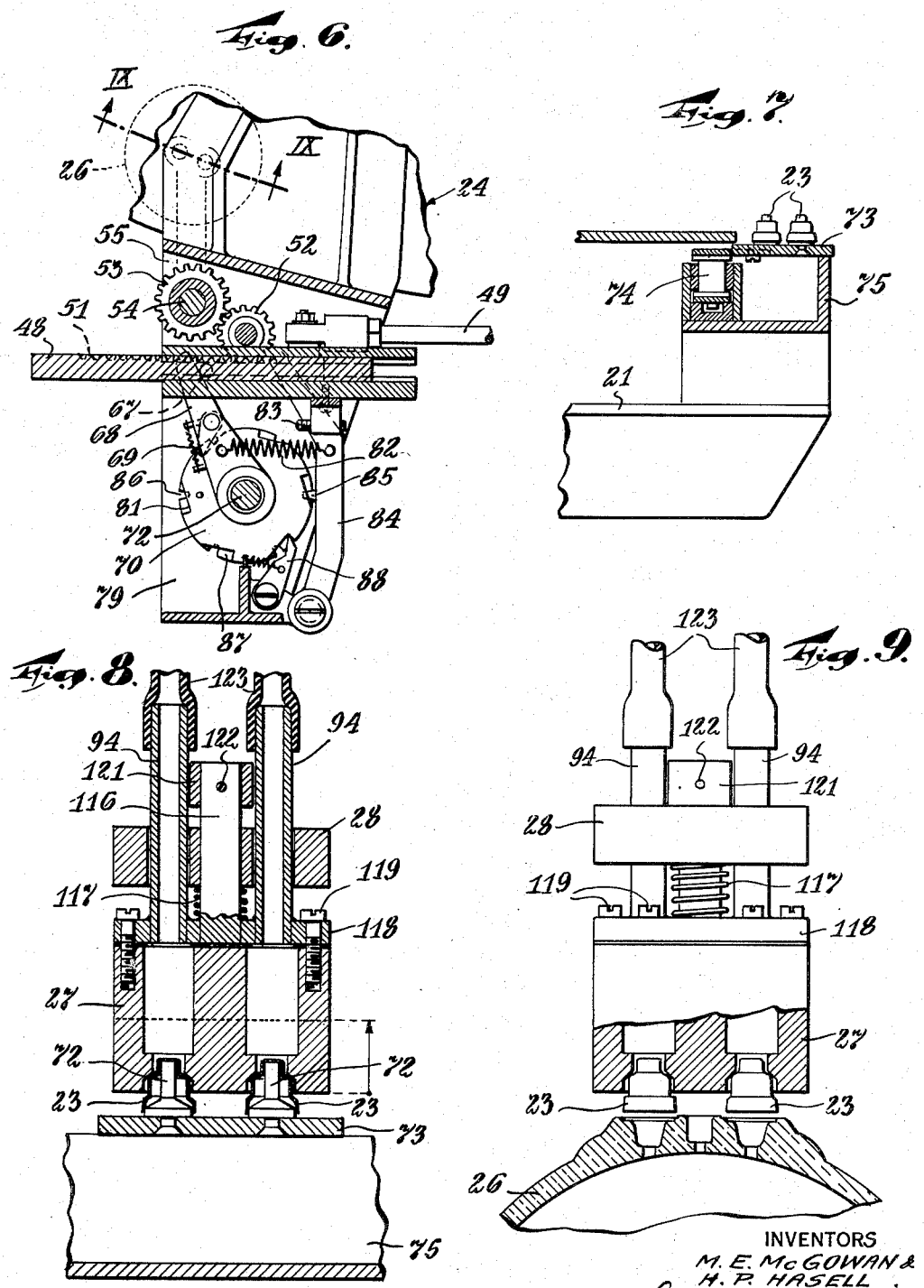

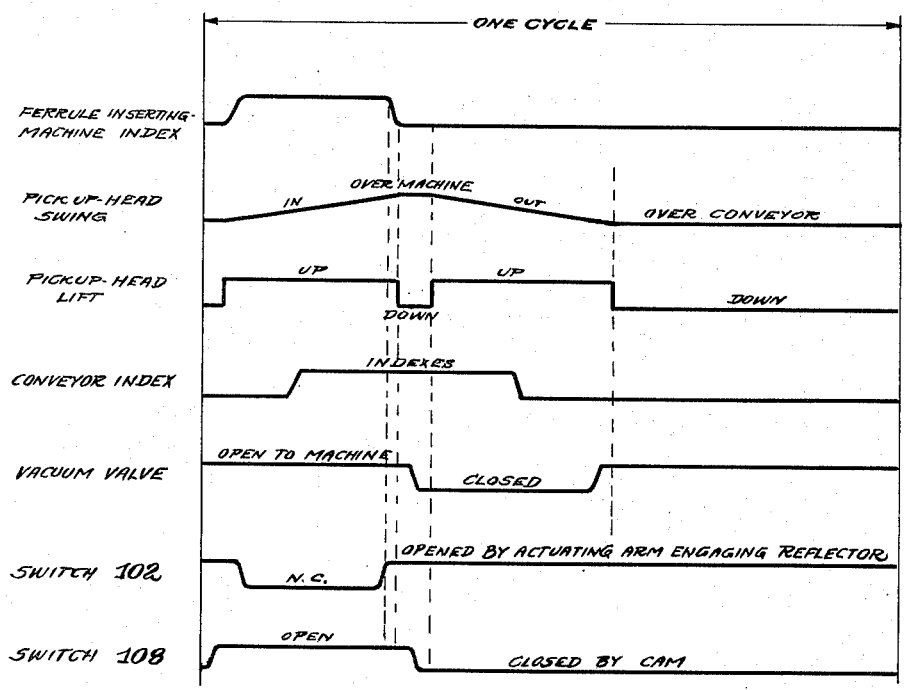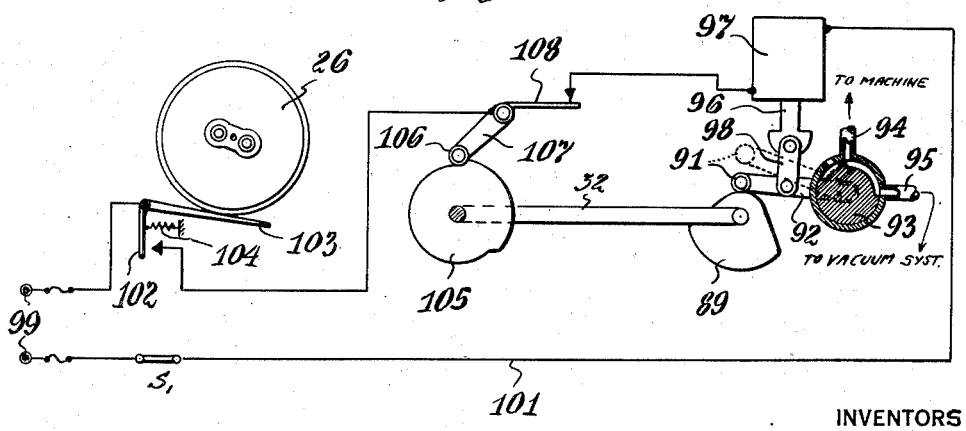

2,764,799
MACHINE FOR FEEDING FERRULES TO SEALED-BEAM REFLECTORS

Michael E. McGowan and Henry P. Hasell, Bloomfield, N. J., assignors to Westinghouse Electric Corporation, East Pittsburgh, Pa., a corporation of Pennsylvania Application August 23, 1951, Serial No. 243,312

4 Claims. (Cl. 29—25.19)

This invention relates to the insertion or sealing of contact ferrules to "sealed-beam" reflectors and, more particularly, to apparatus for automatically transferring such ferrules from a conveyor to sealed-beam reflectors while carried on an inserting machine.

The principal object of our invention, generally considered, is to provide, in combinaation with a seal-beam ferrule-inserting machine, a conveyor on which such ferrules are moved to the vicinity of said inserting machine, and transfer mechanism to pick up said ferrules, swing them over an indexed reflector on said inserting machine move them down to said reflector, and release them thereon.

Another object of our invention is to provide an improved method of feeding ferrules to sealed-beam reflectors, comprising placing said ferrules spaced as groups, at distances corresponding with the spacing desired on said reflectors, on a conveyor, lifting and swinging said grouped ferrules from said conveyor, and lowering them to and releasing them on said reflectors, while mounted on an inserting machine, so that they may subsequently be inserted therein.

A further object of our invention is to provide, in combination with a sealed-beam ferrule-inserting machine, consisting of a conveyor spider with a plurality of heads arranged in a circle about a vertical axis, each of said heads being constructed for holding one of said reflectors while certain operations are performed thereon, means for rotating said spider, step by step about said axis and indexing said heads thereon through a plurality of positions, means at said positions for loading said reflectors one by one on said heads, heating said reflectors, positioning ferrules on said heated reflectors, inserting them therein, positioning exhaust tubes on and sealing them to said reflectors, and unloading said reflectors one by one after applying said ferrules and exhaust tubes thereto.

A still further object of our invention is to provide transfer means for moving ferrules from a chain conveyor to a ferrule-inserting machine for sealed-beam reflectors, said machine comprising a shaft mounted vertically and disposed near said inserting machine and conveyor, a sleeve mounted on said shaft, means for oscillating and reciprocating said sleeve, the latter for that purpose having a V-shaped slot and the shaft carrying a roller received in said slot, a spring acting between said shaft a sleeve for raising the latter, an arm carried by said sleeve, a suction head on the free end of said arm, and adapted to fit over a group of ferrules on said conveyor, means for oscillating said shaft to move said arm between stops, vacuum-supplying means associated with said suction head, and means for connecting said vacuum-supplying means to and disconnecting it from said suction head, whereby the arm is movable down to place its suction head over a group of ferrules on said conveyor to pick up and raise them, swing them over to a position above an indexed reflector, move them down over said reflector, and release them thereon.

Other objects and advantages of the invention, relating to the particular arrangement and construction of the various parts, will become apparent as the description proceeds.

In the scale drawing:

Fig. 1 is a plan of a sealed-beam ferrule-inserting machine and associated apparatus embodying our invention.

Fig. 2 is a front elevational view of the apparatus shown in Fig. 1.

Fig. 3 is a vertical sectional view through the chain conveyor for transporting ferrules to the inserting machine, the section being taken on the line III—III of Fig. 4, looking in the direction of the arrows.

Fig. 4 is a fragmentary plan, corresponding to Figure 1 but on a larger scale, a portion being shown in horizontal section on the line IV—IV of Figure 3.

Fig. 5 is a fragmentary vertical sectional view on the line V—V of Figure 3, in the direction of the arrows.

Fig. 6 is a fragmentary horizontal sectional view on the line VI—VI of Figure 3, in the direction of the arrows.

Fig. 7 is a fragmentary vertical sectional view on the line VII—VII of the Figure 3, in the direction of the arrows.

Fig. 8 is a fragmentary vertical sectional view on the line VIII—VIII of Figure 4, in the direction of the arrows.

Fig. 9 is a fragmentary elevational view of the ferrule pick-up head, shown partly in section as in Fig. 8, except that said head is here in position for depositing ferrules on a reflector therebeneath.

Fig. 10 is a functional diagram co-relating the operation of the various parts of the apparatus.

Fig. 11 is a wiring diagram of the apparatus.

In our application Ser. No. 211,956, filed Feb. 20, 1951, and entitled "Method and Machine for Processing the Reflectors of Sealed-Beam Lamps," we have disclosed apparatus for processing such reflectors after the glass portions thereof have had ferrules and the metal reflecting coatings applied thereto. In the present application, we are concerned with the previous transporting of contact ferrules to position on the glass reflector portions for sealed-beam lamps, for being sealed thereto, so that they may thereafter be processed as disclosed in said earlier application.

Our apparatus consists generally of a ferrule inspection, repair and loading table 21 at one end of a chain conveyor 22 to carry the contact ferrules 23 in groups of two or three, for example, depending on the number of ferrules used on each of the lamps being manufactured, to the vicinity of a ferrule inserting machine 24 and a transfer device 25 to lift the ferrules 23 from the conveyor 22 and deposit them in the sealing position on glass sealed-beam reflector parts 26, sometimes termed "reflectors" for short, carried by the inserting machine 24.

Referring to the drawing in detail, like parts being designated by like reference characters, the transfer device 25 has vacuum cup means 27 on the end of an arm 28 which is moved to cause said cup means to reciprocate upwardly, after picking up a group of ferrules 23 from the end portion of the conveyor 22 near the inserting machine 24. The arm 28 is then swung counterclockwise as viewed from above, until the cup means 27 is directly over a reflector 26 indexed on the machine 24, whereupon it is lowered to place the carried ferrules on said reflector in position for inserting and sealing thereto.

The vacuum connection to the cup means is then disconnected, leaving the ferrules on the reflector, and the arm 28 returns to pick up the next group of ferrules carried by the next plate of the chain conveyor, for deposit on the reflector next to be indexed in position for ferrule reception.

This means that while the transfer arm 28 is moving a group of ferrules to the inserting machine, the conveyor 22 being driven from the shaft 32 that drives the ferrule-inserting machine 24 and the transfer device 25, is moving another group of (in this embodiment two) ferrules 23 to the pick-up position. The use of our invention is a simplification of operations, combining inspection, repair, and loading of the ferrules. It involves a moving of the operator who loads the reflectors 26 to the back of the inserting machine, thus giving her more room than previously. It also involves the placing of the ferrule loading operator in a cooler position than heretofore.

The inserting machine and drive mechanism

All the apparatus, heretofore generally described is, in the embodiment illustrated, driven from a single source of power, such as the motor 29, so that the parts operate in the desired synchronism. The motor 29 is connected through reduction gearing 31 to drive shaft 32 as by means of a chain 33 passing over a sprocket wheel 34 mounted on a shaft 35 projecting from the box of the reduction gearing 31 and a sprocket wheel 36 on the end of said drive shaft.

Turning of the shaft 32 causes the step by step or indexing rotation of the spider 37 of the inserting machine 24 carrying heads 38, to which during processing are secured the reflectors 26, through mechanism in gear box 39. Such includes a cam wheel (not shown) with axially offset portions sequentially engaging rollers (not shown) but fixed to the spider for driving the same. Such mechanism being standard in such equipment (see, for example, the drive for the spider 106 through its vertical shaft 108 by 112 carried thereon and formed by a series of rollers 113; with which the present mechanism corresponds, driven by wheel 114 formed with a trough portion which joins axially offset trough portions 120 and 130; with which the unillustrated present cam wheel may correspond; forming a cam device for driving the spider step-by-step, as disclosed in the Green application Ser. No. 62,343, filed November 27, 1948, now Patent No. 2,569,852, dated Oct. 2, 1956) is not illustrated in detail.

The shaft 32 carries on its forward end, as viewed in Figure 2, a cam 41 for operating the ferrule transfer device 25. A roller 42 riding within this cam is attached to an arm 43 of a bell crank lever 44 pivoted to a standard 45 extending to the base 46 of the machine. The other arm 47 of said bell crank lever is connected to a slide bar 48 by means of a link 49, opposite ends of which are respectively pivoted to the arm 47 and the right hand end of the slide bar 48.

The slide bar 48 is provided on a side with teeth, viewed in Fig. 4, forming a rack 51 engaging an idler pinion 52, in turn meshing with a gear wheel 53 attached to a vertical transfer shaft 54, pivoted in a bearing 55 mounted on the frame 56 of the machine. Said transfer shaft is provided with an anti-friction thrust bearing 60 and carries a roller 57 adjacent its upper end pivoted on a screw 58 secured thereto, as viewed in Fig. 5. Disposed over said shaft 54 is a sleeve member 59 provided with an angular slot 61, viewed in Fig. 3. Said slot has two branches projecting upward from its central portion, making it generally V-shaped in elevation.

The upper end of the vertical shaft 54 is reduced in section, as indicated at 62, and encircled by a coiled compression spring 63 acting between the shoulder 64 at its bottom portion and a cap or plate 65 receiving the upper end of said reduced portion 62. The cap 65 is secured to the upper end of the sleeve 59, as by means of screws 66, thereby closing the annular space between the reduced portion 62 and the sleeve 59. By virtue of the coiled spring 63, positioned as illustrated in Fig. 5, the roller 57 normally tends to remain in the bottom of the slot 61, with the sleeve 59 elevated to maximum extent above the shaft 54, and thereby holding the transfer arm 28 in its uppermost position. The conveyor is driven from the shaft 32 through cam 41 by means of a pin 67 secured to the slide bar 48, projecting downwardly therefrom, and engaging a lever 68 which serves to intermittently advance the chain conveyor 22 one plate 73 at a time by its pawl 69 engaging a drive ratchet 70 on the conveyor drive shaft 72.

Inspection, repair, loading, and conveyor mechanism

The ferrule-charging operator 71, inspects, repairs if necessary, and loads ferrules 23 on pins 72 of the conveyor 22. The pins 72 upon which the ferrules are placed by the operator 71 are secured in groups (in the embodiment, pairs,) to plates 73 which, in turn, are secured to links of the chain 74. Said plates 73 ride upon stationary supports 75, as seen from Figure 7, and travel in counterclockwise direction, as evident from Figure 1. The chain 74 rides over two sprocket wheels, 76 and 77, the former of which is fixed on drive shaft 72' and driven intermittently by the slide bar 48 which also forms part of the transfer device 25. The sprocket wheel 76 and transfer device 25 are partially housed between upper plate or bracket 78 and lower plate or bracket 79 secured to the frame 56 of the ferrule-inserting machine. The lower end of the drive shaft 72' has two disks, secured thereto. The upper disk is the drive ratchet 70 and has six teeth formed by indentations 81 equally spaced along its circumference, to receive the pawl 69 of the lever 68. A spring 82 fastened to said lever tends to hold it in engagement with an adjustable stop 83. The other end of said spring is fastened to a second lever 84 (see Figures 4 and 6).

Said lever 84 has a locking tooth 85, which engages one of a series of cavities 86 in the lower disk 87 on said vertical shaft when the next set of ferrules are advanced pivotally beneath the vacuum cup. The latter lever is pivotally attached to the lower plate 79, as shown. A second spring-actuated pawl 88 engages the ratchet and its shaft, during the return travel of the lever 68 and its pawl 69. The pin 67 secured to the lower face of the aforementioned sliding bar 48, also on return movement of the bar engages the locking lever 84, keeping its tooth 85 disengaged from the lower disk, as shown in Figure 4.

A cam designated 89, see Figure 2, is attached to the main drive shaft 32. A roller 91 attached to the outer end of a lever 92 from a pivoted vacuum valve 93, shown in Figures 2 and 11, rides upon said cam. Said vacuum valve 93 connects and disconnects through pipe 94 the vacuum cup means 27, shown in Figures 8 and 9, with respect to a pipe 95 connected to a source of vacuum. The armature 96 of a solenoid 97 connected by a link 98 to said lever serves, when the solenoid is energized from source of power 99 through the circuit 101 shown in Fig. 11, to shut off the pipe 95 from and release the vacuum in the pickup head 27, in the event that no sealed-beam reflector 26 has traveled to the ferrule charging position on the inserting machine, shown in Fig. 11, and opened the normally-closed switch 102 in the circuit 101, by engaging the switch operating arm 103 and acting in opposition to the switch closing spring 104. Another cam on said main drive shaft operates a switch 108 to open or close the solenoid circuit.

The shaft 32 also carries a cam 105 engaged by a roller 106 on the end of operating arm 107 of switch 108 in order to open the circuit 101 and prevent energization of the solenoid during the indexing cycle of the inserting machine, the movement of a reflector 26 from the arm 103 allowing the switch 102 to close.

Transfer mechanism

The mechanism for transferring sets of ferrules 23, one set at a time, from the plates 73 to position on reflectors held by the inserting machine 24, comprises the rack-and-gear-driven transfer shaft 54, over which is disposed the sleeve 59 carrying the vacuum-pick-up-means-bearing arm 28. Oscillation of the arm 28, moving picked-up ferrules 23 from over the conveyor 22 to over a reflector 26 and return after ferrule deposit is effected by the rack 51, pinion 52, gear wheel 53 and shaft 54 driving sleeve 59 through roller 57 engaging in slot 61 therein.

Vertical reciprocation of the sleeve 59 and parts carried thereby is effected by adjustable stops 109 and 110 attached to the bracket 78, secured by bolts to the ferrule-inserting machine. These stops serve to stop oscillatory movement and cause the applied force to effect vertical up or down movement of the transfer arm 28, as it reaches its outermost position over the chain conveyor and its innermost position over the ferrule inserting machine. Each stop 109 and 110 comprises, as viewed in Figs. 3 and 4, a roller 111 pivotally mounted adjacent the end of an L-shaped lever 112, connected to the bracket 78 by means of pivot pins 113. Adjustment of the stops 109 and 110 toward and away from the bracket 78 is effected by set screws 114 and 115, the former engaging the levers 112 near the pivot points, and the latter engaging said levers near the roller-mounting portions.

In order to effect a resilient engagement between the vacuum pick-up head 27 and the ferrules 23, said head 27 has an upward extension 116 from its top plate 118 reciprocable in the end portion of the arm 28, as viewed in Figs. 8 and 9. Said extension carries a coiled compression spring 117 acting between the arm 28 and the top of the plate 118, forming the upper closure of the vacuum means 27, and connected to the body thereof by screws 119. Undesired removal of the vacuum cup means 27 from the arm 28 is prevented by a collar 121 over the end of the extension 116, and held thereon by a cotter pin or other desired means 122. The pipes 94 which effect vacuum connection with the device 27 also pass through corresponding apertures in the arm 28 and are connected through the valve 93 to a source of vacuum (not shown) by flexible tubes 123.

*Operation*

We will now trace the operation of the heretofore described mechanism on a reflector 26 from its loading at position 1 on the inserting machine 24, as viewed in Fig. 1, to its removal after passing through position 16 on said machine. The operator at position 1 places reflectors one by one on the heads 38 of the machine, as indexed at position 1, taking the completed reflectors off after passing through position 16. At the same time, the operator 71 at right hand end of chain conveyor, inspects, repairs if necessary, and applies groups of ferrules to the pins 72 on the plates 73 of the conveyor.

After all normally filled positions on the inserting machines and conveyor are occupied in normal operation, as diagrammed in Fig. 10, we will consider the pick-up head 27 as connected to the vacuum supply by having the solenoid 97 rendered inoperative by at least one of the switches 102 and 108 in open position. Said head is considered to start by reciprocating down over a set of ferrules on an indexed plate 73 of the conveyor, resiliently engaging said plate, then reciprocating back to the upper position. It then oscillates over to a position over an indexed reflector on the inserting machine, and reciprocates down to place the said ferrules in position on said reflector. The vacuum connection is then released by closure of the vacuum valve 93, indicated by the section of line of Fig. 10 leading from "vacuum valve" and marked "closed."

This reciprocation and oscillation is of course effected by the rack, pinion, gear, slotted sleeve, and stop arrangement, heretofore described, the roller 57 pivoted to the now-turning vertical shaft 54 permitting, after ferrules are picked up, first, a vertically upward movement of the sleeve 59, due to the spring therewithin, until the roller reaches the lowermost position of V-shaped slot 61, when the suction cup is swung until the arm 28 engages the second adjustable stop, 110, placing the carried ferrules directly above the indexed sealed-beam reflector.

The vertical shaft 54 continuing to turn now forces the sleeve 59, the transfer arm 28, and its suction head 27, vertically downward, due to the V-shaped slot 61, until the head 27 reaches the position as shown in Figure 9, at which time the cam on the main drive shaft is about to close the valve 93 and shut off the vacuum to the suction head, thereby releasing the ferrules into their respective circular cavities on the sealed-beam reflector. During this transfer interval, the conveyor indexes, as seen from Figure 10, placing another set of ferrules in position to be transferred. This is accomplished by the vertical pin 67 on said slide bar 48 engaging the aforementioned ratchet lever 68 which advances the drive ratchet 70 until the next set of ferrules is exactly below the pick-up position.

Switch 102 is opened again by a new sealed-beam reflector as it comes into position 4 on the inserting machine. Switch 108 is open only during the indexing cycle of the ferrule inserting machine, to prevent the solenoid operating when switch 102 is closed.

When the ferrules are deposited upon the sealed beam-reflector in their respective cavities, the suction head again moves, first vertically upward, and then swings in a clockwise arc, until the transfer arm again strikes the first adjustable stop. Before the suction head again reaches its lowermost pickup position over a new set of ferrules, the vacuum valve is opened again, providing there is a new reflector in position 4 on the ferrule inserting machine, to keep switch 102 open. Should there be no sealed beam reflector in position 4, switch 102 remains closed and the suction head 27 is not operative to pick up a set of ferrules.

After application of a set of ferrules to a reflector at position 4 on the inserting machine, said reflector then continues to pass under the inserting fires acting conventionally between positions 3 and 11, which effect reflector preheating and actual sealing of the ferrules to said reflector. At position 12 an exhaust tube is conventionally applied and sealed in place, and at positions 13, 14 and 15 annealing fires act conventionally on said exhaust tube.

Although a preferred embodiment has been disclosed, it will be understood that modifications may be made within the spirit and scope of the invention.

We claim:

1. A machine for transferring ferrules to and inserting them in sealed-beam reflectors comprising means for holding as groups said ferrules spaced apart on a conveyor distances corresponding with the spacing desired on said reflectors, and means for lifting and swinging said groups of ferrules and lowering them to and releasing them on said reflectors, while the latter are mounted on an inserting machine for subsequent insertion therein.

2. Mechanism for transferring ferrules to reflectors on a sealed-beam ferrule-inserting machine comprising a chain conveyor, a series of plates adapted to support ferrules in positions spaced to correspond with that desired on said reflectors and secured to said conveyor, supports upon which said plates ride, means for intermittently driving said conveyor, a shaft vertically positioned between said inserting machine and conveyor, a sleeve mounted on said shaft having an angular slot, a roller pivoted to said shaft and received in said slot for causing reciprocation of said sleeve upon rotation of said shaft, a spring acting between said shaft and sleeve to urge the later to uppermost position, an oscillating arm carried by said sleeve, a suction head on the free end of said arm and adapted to fit over a group of ferrules on one of said plates, stops for limiting oscillation of said arm, means for operating said shaft with attendant reciprocation of said sleeve to cause oscillation of said arm between said stops, vacuum supplying means associated with said head, and means for connecting said vacuum supplying means to and disconnecting it from said head, whereby said arm is operable to move down over a group of ferrules on a plate, pick up and raise said ferrules, swing them over a reflector on said inserting machine, move them down over said reflector, and release them thereon for subsequent insertion therein.

3. Mechanism for transferring ferrules to reflectors on a sealed-beam ferrule-inserting machine comprising a chain conveyor, a series of plates adapted to support ferrules in positions spaced to correspond with that desired on said reflectors and secured to said conveyor, a shaft vertically positioned between said inserting machine and conveyor, a sleeve mounted on said shaft having an angular slot, a roller pivoted to said shaft and received in said slot for causing reciprocation of said sleeve upon oscillatory rotation of said shaft, a spring acting between said shaft and sleeve to urge the latter to uppermost position, an oscillating arm carried by said sleeve, a suction head on said arm and adapted to fit over a group of ferrules on one of said plates, means for limiting oscillation of said arm, means for operating said shaft with attendant reciprocation of said sleeve to cause oscillation of said arm between said limiting means, and vacuum supplying means associated with said head, whereby said arm is operable to move down over a group of ferrules on a plate, pick up and raise said ferrules, swing them over a reflector on said inserting machine, move them down over said reflector, and release them thereon.

4. Mechanism for transferring ferrules to reflectors on a sealed-beam inserting machine comprising a chain conveyor formed of a series of links, a series of plates, each of which is secured to one of said links, supports upon which said plates ride, sprocket wheels over which said links pass, means for intermittently driving one of said wheels, a shaft vertically positioned between said inserting machine and conveyor, a sleeve mounted on said shaft having a V-shaped slot receiving a roller pivoted to said shaft for causing reciprocation of said sleeve upon rotation of said shaft, a spring acting between said shaft and said sleeve to urge the latter to uppermost position, an arm carried by said sleeve, a suction head on the free end of said arm and adapted to fit over a pair of ferrules on one of said chain conveyor plates, means for oscillating said shaft with attendant reciprocation of said sleeve to cause movement of said arm between stops, vacuum-supplying means associated with said suction head, and means for connecting said vacuum-supplying means to and disconnecting it from said suction head, whereby said arm moves down over a pair of ferrules on a conveyor plate, picks up and raises said ferrules, swings them over an indexed reflector, moves them down over said reflector, and releases them thereon.

References Cited in the file of this patent

UNITED STATES PATENTS

| | | |
|---|---|---|
| 2,069,086 | Donovan et al. | Jan. 26, 1937 |
| 2,317,031 | Cotman et al. | Apr. 20, 1943 |